(12) United States Patent
Thormaehlen

(10) Patent No.: US 9,860,226 B2
(45) Date of Patent: Jan. 2, 2018

(54) SENSITIVE INFORMATION CLOUD SERVICE

(71) Applicant: SAP SE, Walldorf (DE)

(72) Inventor: Frederik Thormaehlen, Mannheim (DE)

(73) Assignee: SAP SE, Walldorf (DE)

( * ) Notice: Subject to any disclaimer, the term of this patent is extended or adjusted under 35 U.S.C. 154(b) by 238 days.

(21) Appl. No.: 14/729,531

(22) Filed: Jun. 3, 2015

(65) Prior Publication Data
US 2016/0359828 A1   Dec. 8, 2016

(51) Int. Cl.
*H04L 29/06* (2006.01)
(52) U.S. Cl.
CPC ............ *H04L 63/08* (2013.01); *H04L 63/102* (2013.01)
(58) Field of Classification Search
CPC .............................. H04L 63/08; H04L 63/102
See application file for complete search history.

(56) References Cited

U.S. PATENT DOCUMENTS

| 5,400,402 A * | 3/1995 | Garfinkle | H04N 7/162 348/E5.004 |
|---|---|---|---|
| 8,856,869 B1 * | 10/2014 | Brinskelle | H04L 63/08 726/12 |
| 2013/0298247 A1 * | 11/2013 | Laurila | G06F 21/6245 726/26 |
| 2014/0082749 A1 * | 3/2014 | Holland | G06F 21/60 726/29 |
| 2014/0289789 A1 * | 9/2014 | Poornachandran | G06F 21/6245 726/1 |

OTHER PUBLICATIONS

Shirk (How to Get the Most out of the Vera Dashboard, Aug. 25, 2015, 4 pages).*
Zapolskas (Securing Cloud Storage Service, Jun. 2012, 87 pages).*

* cited by examiner

*Primary Examiner* — Oleg Korsak
(74) *Attorney, Agent, or Firm* — Schwegman Lundberg & Woessner, P.A.

(57) ABSTRACT

In an example embodiment, login credentials are received from a user. These login credentials are validated. Sensitive information is received from the user. The sensitive information is then stored in a cloud-based database. One or more access limitations are established for the sensitive information. A request for the sensitive information is received, from a first third party entity, via an application program interface (API) distributed to a plurality of third party entities. It is then determined if providing access to the sensitive information to the first third party entity would violate the one or more access limitations for the sensitive information. In response to a determination that the providing access to the sensitive information to the first third party entity would not violate the one or more access limitations for the sensitive information, the sensitive information is transmitted to the first third party entity.

15 Claims, 10 Drawing Sheets

SENSITIVE INFORMATION CLOUD SERVICE

TECHNICAL FIELD

This document generally relates to methods and systems for use with computer networks and applications deployed in them. More particularly, this document relates to a cloud service providing sensitive information to third parties.

BACKGROUND

Sensitive information, such as name, social security number, address, credit card information, marital status, gender, number of children, medical information, etc. for a particular user is currently spread across hundreds of systems on the Internet. Some of this information, such as social security number, tends to be relatively stable in nature. However, some of this information, such as address, may be routinely changed. Currently, the process of changing such information requires notifying each of the potentially hundreds of systems that contain such information about the change. For example, a particular user may have multiple online banking profiles, brokerage accounts, stores in which he or she has ordered in the past, patient profiles (from multiple medical professionals), and so on. In addition to it being beneficial to the user for each of these third parties to have updated sensitive information (e.g., the next time the user shops from a particular store his or her new address will be on file), it is also beneficial to the third parties themselves (e.g., updated addresses to which to send catalogs to entice further sales). The same could apply to the sensitive information of a business. Furthermore, users often feel out of control over their sensitive data because it gets spread out over the Internet.

BRIEF DESCRIPTION OF DRAWINGS

The present disclosure is illustrated by way of example and not limitation in the figures of the accompanying drawings.

DETAILED DESCRIPTION

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques have not been shown in detail.

In an example embodiment, a solution is provided that includes a cloud service where users can store sensitive information to be shared among multiple third parties. The cloud service provides an application program interface (API) that can be utilized by any number of different applications, websites, and services over the Internet. The API could be used by an application, website, or service (hereinafter known collectively as "entities" or "third party entities") to obtain up-to-date versions of the sensitive information, without requiring that the user directly notify that application, website, or service of the updated sensitive information.

In another example embodiment, a dashboard may be provided to the user so that the user can monitor access to the sensitive information. This may include, for example, identifications of the entities that have accessed the sensitive information, as well as the times and frequency of the accesses. Access rights may be established on an entity-by-entity basis, allowing the user to prevent access to the sensitive information by an entity, either permanently or on a limited basis (e.g., limits on the number of overall accesses; limits on the number of accesses within a set period of time; time of day, month, or year limitations; limitations on intended usage of the sensitive information; etc.).

It should also be noted that while the above appears to imply that the third party gets access to the data first and then later the user restricts access, embodiments are foreseen where the user first restricts access prior to the third party obtaining access. In one example embodiment the user must approve requests to access the data from each third party requesting access.

Figure 1:
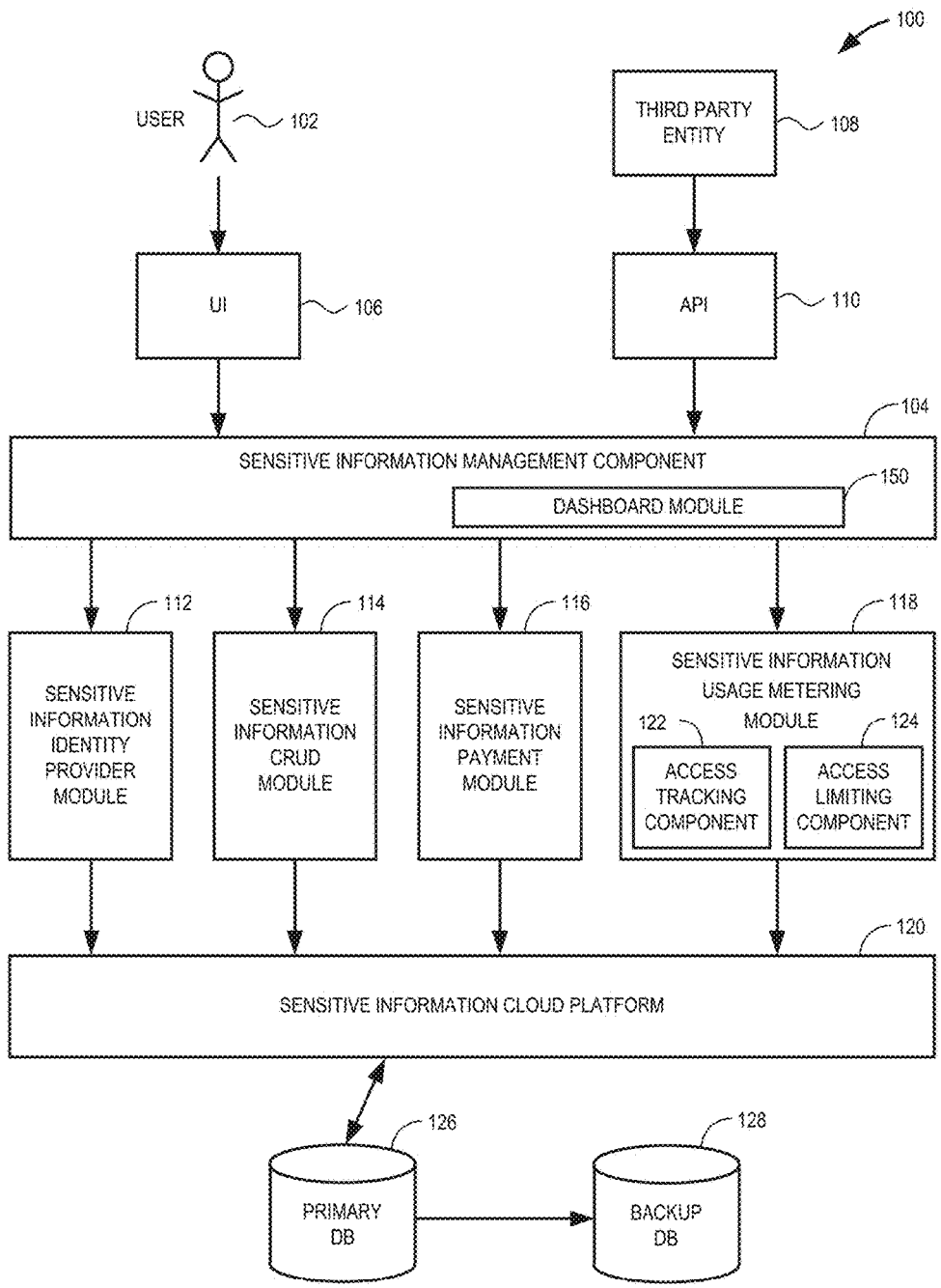
FIG. 1 is a block diagram illustrating a system, in accordance with an example embodiment, for providing centralized distribution of sensitive information.

FIG. 1 is a block diagram illustrating a system 100, in accordance with an example embodiment, for providing centralized distribution of sensitive information. The system 100 contains a user 102 who uploads or inputs sensitive information to a sensitive information management component 104. This uploading or inputting of sensitive information may be performed via a sensitive information user interface (UI) 106. The sensitive information user interface 106 will be described in more detail below, but in one embodiment, this user interface 106 may include a web site where the user 102 can enter the sensitive information (as well as optionally providing a dashboard for the user 102 to see and manage access by third party entities to the sensitive information). In another example embodiment, the user interface 106 may include or be embedded within a dedicated application operated by the user 102, such as an application ("app") running on a mobile device.

The sensitive information management component 104 acts to manage the gathering, updating, and using of sensitive information from the user 102. A third party entity 108 may access the sensitive information management component 104 via a sensitive information API 110. Through the sensitive information API 110, the third party entity 108 can request and receive pieces of sensitive information about the user 102. In some example embodiments, the user 102 may have a direct relationship with the third party entity 108, such as being a customer of the third party entity 108 and having a previous relationship involving the purchasing of goods and/or services from the third party entity 108. In another example embodiment, the user 102 may have no direct relationship with the third party entity 108 but may nevertheless desire that the third party entity 108 be granted access to the sensitive information. The latter embodiment may be useful in instances where, for example, the sensitive information in question is not significantly private. For example, if the user 102 initiates a name change, he or she may wish that any third party entity 108 be able to see the new name, even without express authorization.

As will be described in more detail later, the third party entity 108 may also use the sensitive information API 110 to pay for the access to the sensitive information.

As stated earlier, the sensitive information management component 104 acts to manage the gathering, updating, and using of sensitive information from the user 102. In performing these functions, it may utilize the functionality of a number of specific modules. Depicted here are a sensitive information identity provider module 112; sensitive information create, read, update, and delete (CRUD) module 114; sensitive information payment module 116; and sensitive information usage metering module 118. Each of these modules 112-118 is used to perform one or more specific functions when the sensitive information management component 104 communicates with a sensitive information cloud platform 120.

The sensitive information identity provider module 112 is used to verify the identity of the user 102 prior to the user 102 being able to modify his or her sensitive information (as stored by the sensitive information cloud platform 120) or perform other tasks associated with the sensitive information (such as, for example, manage access rights as to which sensitive information can be accessed by which third party entities 108).

The identity verification may be performed in a number of different ways. In a first example embodiment, the identity of the user 102 is verified by requesting and validating a set of credentials, such as a user name and password, or a certificate or other security authorization. In another example embodiment, the identity of the user 102 is verified through the asking of a set of questions whose answers correspond to the user 102. For example, the user 102 may be asked to verify his or her social security number, an address that he or she lived at in the last 10 years, and an employer that the user 102 worked for in the last 10 years. The correct answer to each of these questions can be used to verify the identity of the user 102.

In an example embodiment, the API 110 may be used to automatically prefill forms on websites where this data is required. The user saves time from manually filling the forms with the sensitive data.

The sensitive information CRUD module 114 is utilized when the user 102 creates or changes sensitive information on the sensitive information cloud platform 120. In an example embodiment, the sensitive information CRUD module 114 acts to send database specific commands to the sensitive information cloud platform 120, such as, for example, Structured Query Language (SQL) commands in the case where the underlying database storage is or includes a relational database.

The sensitive information payment module 116 is used to process a payment from the third party entity 108 in exchange for access to the (latest updated) sensitive information of the user 102. In an example embodiment, this payment may be a micropayment (i.e., a payment of less than a dollar) each time the third party entity 108 accesses the sensitive information, although alternative fee arrangements (e.g., subscriptions for unlimited access) are possible as well.

In an example embodiment, the cost of access to the sensitive information may vary based on a number of different factors. The type of the sensitive information, for example, may help determine the cost of access. Sensitive financial information, such as banking information or credit card information, may be of a different value to the third party entities 108 than name information. Indeed, different types of information may be of different values to different types of third party entities 108. A company that, for example, sends out fliers to users via the postal service may be most interested in updated mailing address information for a user 102, whereas an online bank may be more interested in updated financial information. Thus, different rates can apply based on the type of the information and the type of the third party entity 108.

In another example embodiment, the cost of access to the sensitive information may be dynamically determined based on a number of factors, including the actual sensitive information itself. Not only can certain categories of sensitive information be more valuable to certain types of third party entities, but certain values within those categories can be more or less valuable as well. For example, updated information regarding a user 102 whose sensitive information reveals a high net worth may be more valuable than updated information regarding a user 102 whose sensitive information reveals a low net worth. Likewise, a particular gender, age, etc. for the user 102 may mean that the sensitive information for that user 102 has a higher or lower value to a particular third party entity 108. Since this type of information can change (e.g., a high net worth individual could become a low net worth individual), in an example embodiment the values in the data of the sensitive information may be examined at access time and the cost of access may be appropriately adjusted based on those values.

The sensitive information usage metering module 118 can be used to meter access to the sensitive information by the third party entity 108. The sensitive information usage metering module 118 may include an access tracking component 122 and an access limiting component 124. The access tracking component 122 may act to monitor accesses to particular pieces of sensitive information by the third party entities 108. In an example embodiment, the access tracking component 122 maintains information about the times and dates of accesses to each individual piece of sensitive information by the third party entities 108 and which third party entities 108 performed the accessing. This allows statistics to be generated regarding the amount and frequency of accesses to particular pieces of sensitive information. The granularity of such tracking can vary based on implementation. In an example embodiment, each type of sensitive information is tracked independently. For example, the fact that a user's 102 address was accessed at a particular time by a particular third party entity 108 is tracked, whereas the fact that the user's 102 credit card information was accessed at a different time by the third party entity 108 is also tracked.

The user 102 is then able to interact with the sensitive information management component 104 to view this statistical information via a dashboard, and set limits on the access to pieces of sensitive information. These limits can be established in as fine a granularity as that with which the accesses are tracked. Thus, for example, the user 102 may indicate that his or her credit card information can only be accessed by a particular third party entity 108 once a day. These limits can either be set globally (i.e., applying to all third party entities) or on an entity-by-entity basis. These limits can then be enforced by the access limiting component 124, which can prevent or throttle accesses based on the defined limits.

The sensitive information cloud platform 120 manages the storage and maintenance of the sensitive information in one or more databases, such as a primary database 126 and backup database 128. The sensitive information cloud platform 120 may take sensitive information provided by the sensitive information CRUD module 114 and store it in the primary database 126. When the user 102 later updates the sensitive information, the sensitive information cloud platform 120 may replace pieces of the sensitive information in the primary database 126 with the updated information. Periodically, the backup database 128 may perform a backup of the primary database 126.

The sensitive information cloud platform 120 acts to store the sensitive information in the cloud. The cloud includes the storing of information across multiple physical (and sometimes virtual) machines, all accessible remotely. In an example embodiment, this involves deploying groups of remote servers and software networks that allow centralized data storage and online access to the data. As such, even though the primary database 126 is depicted in FIG. 1 as being a single device, in reality it can be distributed among many different devices, such as server machines.

In an example embodiment, some or all of the functionality described with respect to FIG. 1 may be implemented in an in-memory database management system. In an in-memory database management system, persisted data is stored in main memory of one or more machines, allowing for much faster access than traditional disk-based storage. In an example embodiment, the primary database 126 of FIG. 1 may be stored in an in-memory database management system. In another example embodiment, any or all of the components in FIG. 1 may be stored in an in-memory database management system, including, for example, the sensitive information management component 104, sensitive information identity provider module 112, sensitive information CRUD module 114, sensitive information payment module 116, sensitive information usage metering module 118, sensitive information cloud platform 120, primary database 126, and backup database 128.

Figure 2:
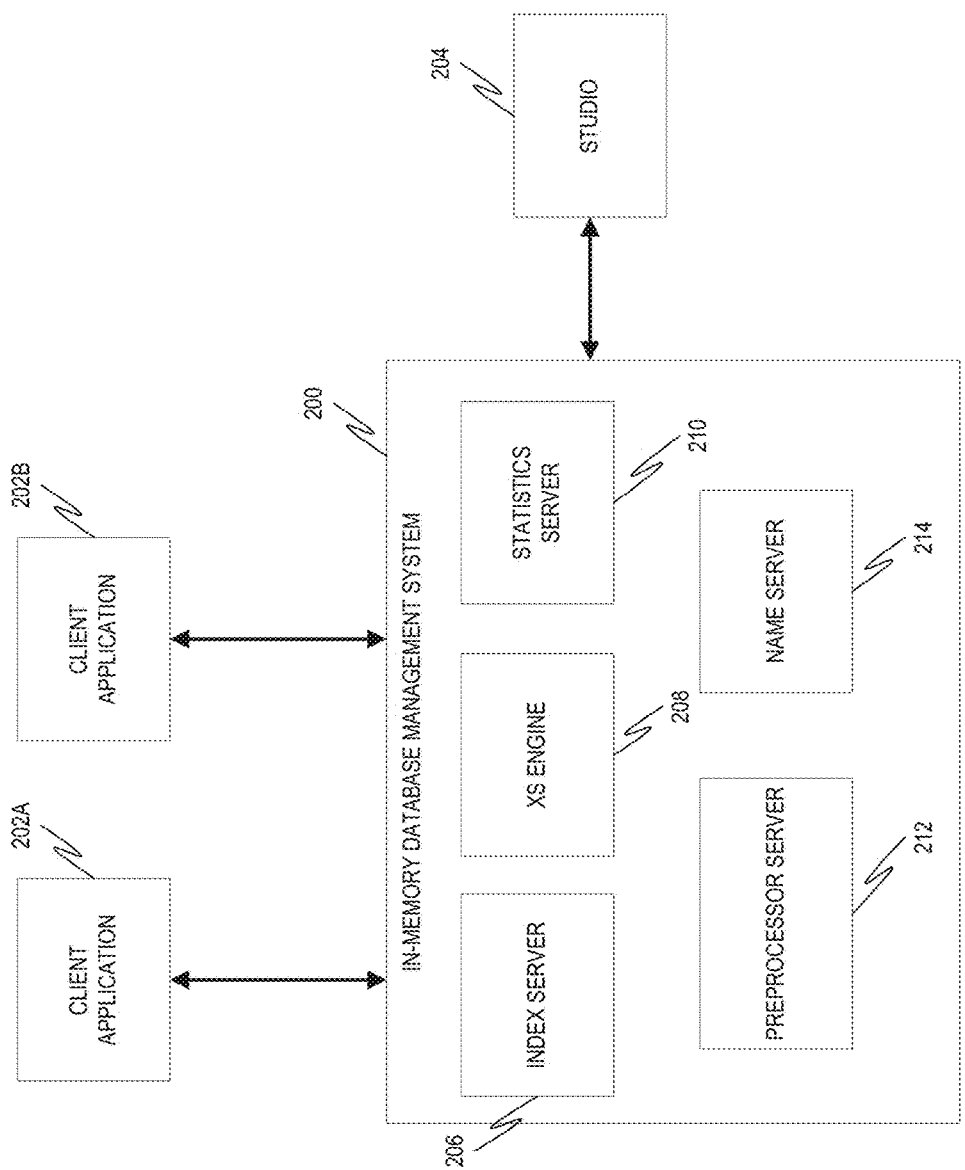
FIG. 2 is a diagram illustrating an in-memory database management system, including its client/external connection points, which can be kept stable in the case of disaster recovery to ensure stable service operations, in accordance with an example embodiment.

FIG. 2 is a diagram illustrating an in-memory database management system 200, including its client/external connection points, which can be kept stable in the case of disaster recovery to ensure stable service operations, in accordance with an example embodiment. Here, the in-memory database management system 200 may be coupled to one or more client applications 202A, 202B. The client applications 202A, 202B may communicate with the in-memory database management system 200 through a number of different protocols, including Structured Query Language (SQL), Multidimensional Expressions (MDX), Hypertext Transfer Protocol (HTTP), Representational State Transfer (REST), and Hypertext Markup Language (HTML).

Also depicted is a studio 204, used to perform modeling or basic database access and operations management by accessing the in-memory database management system 200.

The in-memory database management system 200 may comprise a number of different components, including an index server 206, an XS engine 208, a statistics server 210, a preprocessor server 212, and a name server 214. These components may operate on a single computing device, or may be spread among multiple computing devices (e.g., separate servers).

The index server 206 contains the actual data and the engines for processing the data. It also coordinates and uses all the other servers.

The XS engine 208 allows clients to connect to the system 100 using web protocols, such as HTTP.

The statistics server 210 collects information about status, performance, and resource consumption from all the other server components. The statistics server 210 can be accessed from the studio 204 to obtain the status of various alert monitors.

The preprocessor server 212 is used for analyzing text data and extracting the information on which text search capabilities are based.

The name server 214 holds information about the database topology. This is used in a distributed system with instances of the database on different hosts. The name server 214 knows where the components are running and which data is located on which server.

Figure 3:
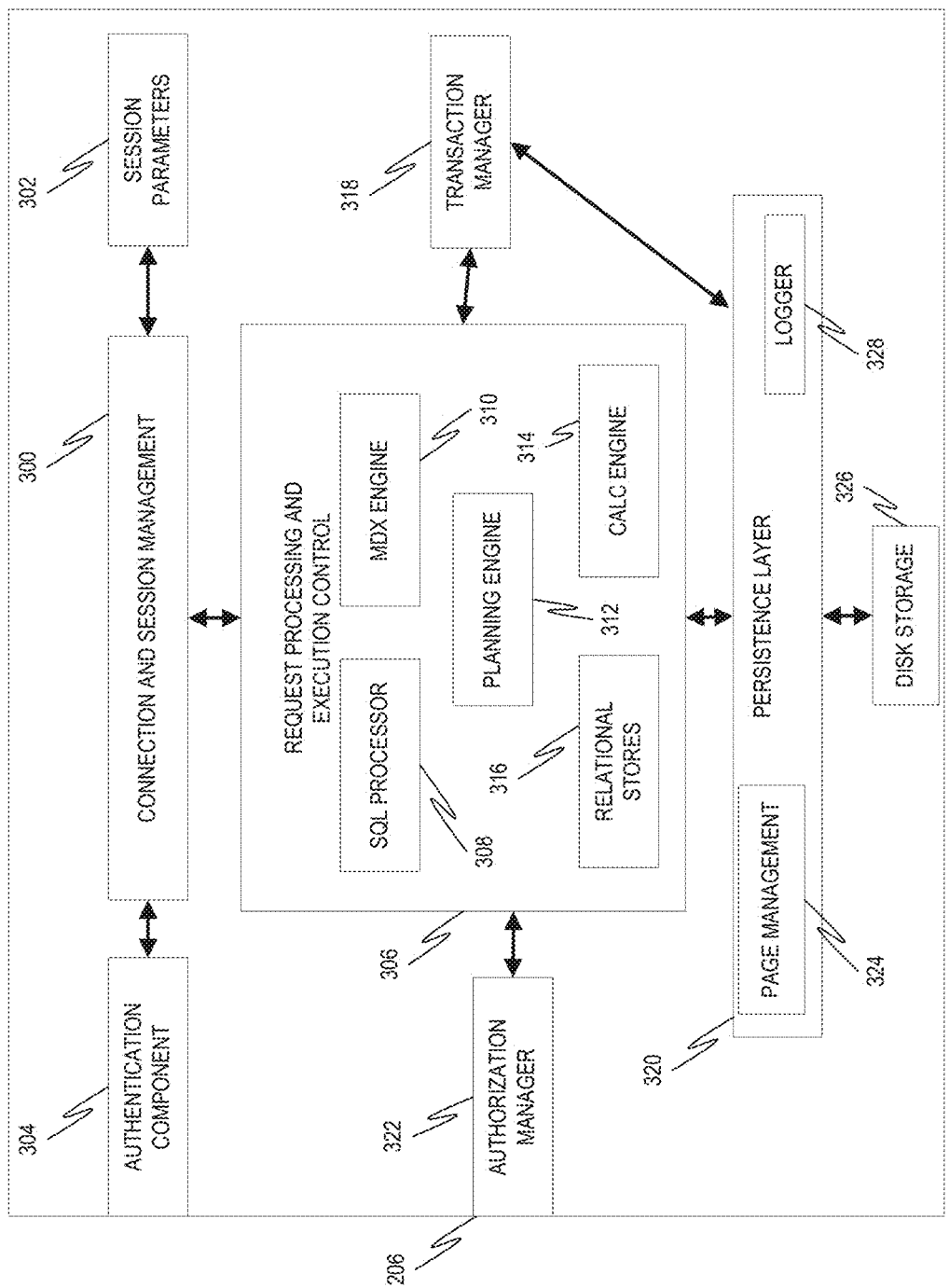
FIG. 3 is a diagram illustrating an index server, in accordance with an example embodiment.

FIG. 3 is a diagram illustrating an index server 206 in accordance with an example embodiment. Specifically, the index server 206 of FIG. 2 is depicted in more detail. The index server 206 includes a connection and session management component 300, which is responsible for creating and managing sessions and connections for the database clients. Once a session is established, clients can communicate with the database system using SQL statements. For each session, a set of session parameters 302 may be maintained, such as auto-commit, current transaction isolation level, etc. Users (e.g., system administrators, developers) may be authenticated by the database system itself (e.g., by logging in with user name and password, using an authentication component 304) or authentication can be delegated to an external authentication provider such as a Lightweight Directory Access Protocol (LDAP) directory.

Client requests can be analyzed and executed by a set of components summarized as request processing and execution control 306. An SQL processor 308 checks the syntax and semantics of the client SQL statements and generates a logical execution plan. Multidimensional expressions (MDX) are a language for querying and manipulating multidimensional data stored in online analytical processing (OLAP) cubes. As such, an MDX engine 310 is provided to allow for the parsing and executing of MDX commands. A planning engine 312 allows applications (e.g., financial planning applications) to execute basic planning operations in the database layer. One such operation is to create a new version of a dataset as a copy of an existing dataset, while applying filters and transformations.

A calc engine 314 implements the various SQL script and planning operations. The calc engine 314 creates a logical execution plan for calculation models derived from SQL scripts, MDX, planning, and domain-specific models. This logical execution plan may include, for example, breaking up a model into operations that can be processed in parallel.

The data is stored in relational stores 316, which implement a relational database in main memory.

Each SQL statement may be processed in the context of a transaction. New sessions are implicitly assigned to a new transaction. A transaction manager 318 coordinates database transactions, controls transactional isolation, and keeps track of running and closed transactions. When a transaction is committed or rolled back, the transaction manager 318 informs the involved engines about this event so they can execute needed actions. The transaction manager 318 also cooperates with a persistence layer 320 to achieve atomic and durable transactions.

An authorization manager 322 is invoked by other database system components to check whether the user has the specified privileges to execute the requested operations. The database system allows for the granting of privileges to users or roles. A privilege grants the right to perform a specified operation on a specified object.

The persistence layer 320 ensures that the database is restored to the most recent committed state after a restart and that transactions are either completely executed or completely undone. To achieve this goal in an efficient way, the persistence layer 320 uses a combination of write-ahead logs, shadow paging, and save points. The persistence layer 320 also offers a page management interface 324 for writing and reading data to a separate disk storage 326, and also contains a logger 328 that manages the transaction log. Log entries can be written implicitly by the persistence layer 320 when data is written via the persistence interface or explicitly by using a log interface.

Figure 4:
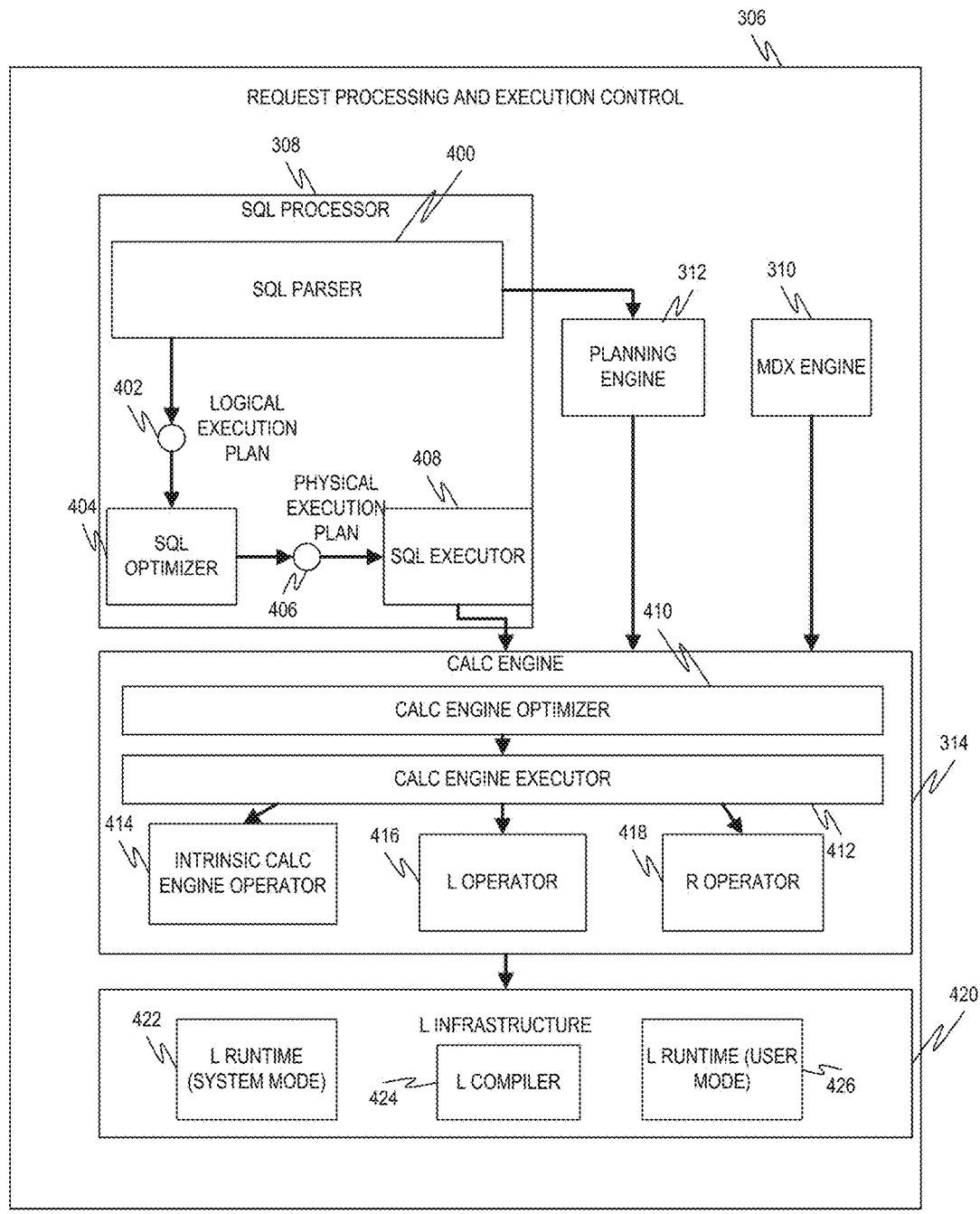
FIG. 4 is a diagram illustrating a request processing and execution control, in accordance with an example embodiment.

FIG. 4 is a diagram illustrating a request processing and execution control 306 in accordance with an example embodiment. This diagram depicts the request processing and execution control 306 of FIG. 3 in more detail. The SQL processor 308 contains an SQL Parser 400, which parses an SQL statement and generates a logical execution plan 402, which it passes to an SQL optimizer 404. The SQL optimizer 404 then optimizes the logical execution plan 402 and converts it to a physical execution plan 406, which it then passes to an SQL executor 408. The calc engine 314 implements the various SQL script and planning operations, and includes a calc engine optimizer 410, which optimizes the operations; a calc engine executor 412, which executes the operations; an intrinsic calc engine operator 414; an L operator 416; and an R operator 418.

An L infrastructure 420 includes a number of components to aid in the running of L procedures, including an L-runtime (system mode) 422, an L compiler 424, and an L-runtime (user mode) 426.

Turning back to FIG. 1, in an example embodiment, steps may be taken to limit or otherwise restrict not just the access to but also the usage of the sensitive information. In one example, the third party entities 108 may agree to certain limitations on their usage of the sensitive information, subject to enforcement via legal agreements with the provider of the sensitive information cloud platform 120. These limitations may include, for example, privacy limitations limiting who, if anyone, the third party entity 108 can itself share the sensitive information with. Such limitations may be of increased importance with the more confidential types of information, such as social security numbers and medical information.

In other examples, more stringent restrictions may be put in place to restrict the usage of the sensitive information. Digital rights management, for example, could be used to formally restrict the usage of the sensitive information to the entity that receives the sensitive information. A certificate, key, or other security object could be issued to the third party entity that has paid for and received a certain piece of sensitive information from the user. The certificate, key, or other security object may be designed such that the sensitive information is encrypted and unreadable without the accompanying certificate, key, or other security object. Furthermore, the certificate, key, or other security object may be unique to and designed to work solely with a particular machine operated by the third party entity, such that any other machine (such as a machine operated by a party other than that particular third party entity) could not decrypt the sensitive information. Of course, this may be more useful in instances where the sensitive information is complex information, such as medical records, that cannot easily be decrypted, copied, and then shared in a decrypted format.

The user interface 106 may present one or more screens that are used by the user 102 to log in and verify identity, as described with respect to the sensitive information identity provider module 112, as well as to input various pieces of sensitive information to the sensitive information management component 104.

Figure 5:
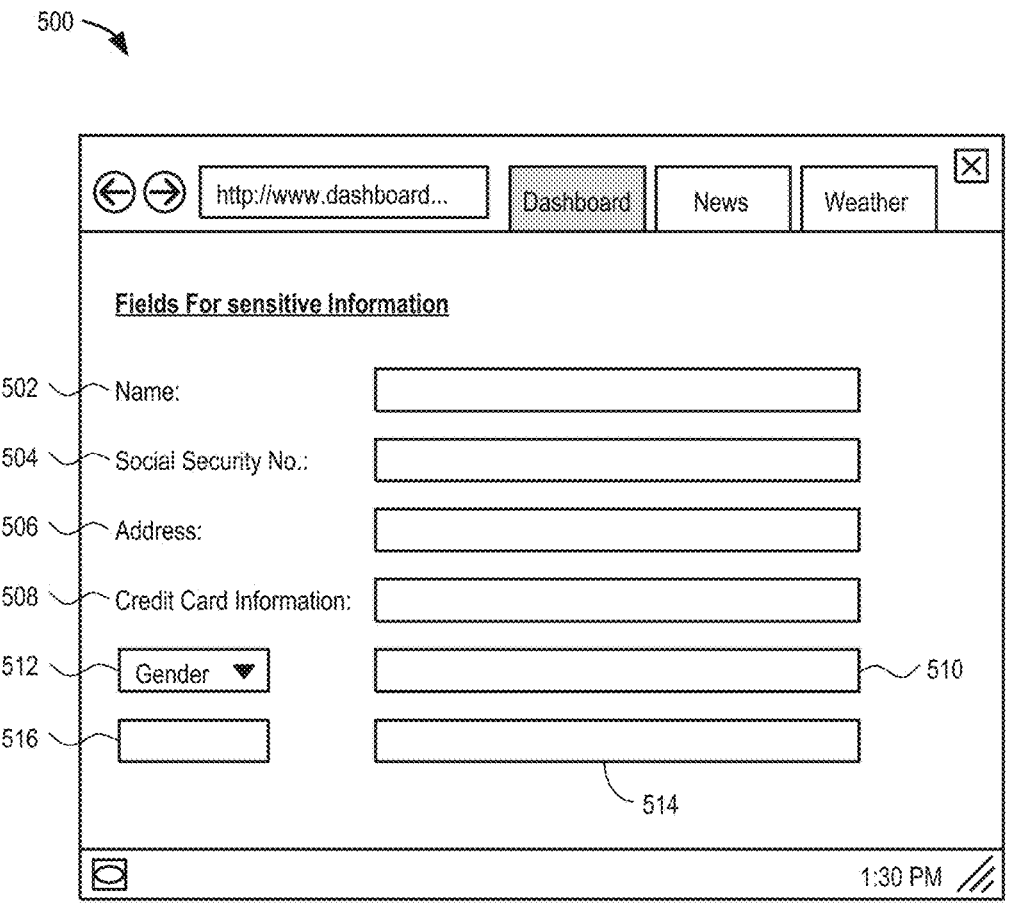
FIG. 5 is a screen diagram illustrating an example user interface, in accordance with an example embodiment, for inputting sensitive information.

FIG. 5 is a screen diagram illustrating an example user interface 500, in accordance with an example embodiment, for inputting sensitive information. Fields for certain default categories of information, including, for example, name 502, social security number 504, address 506, and credit card information 508, may be provided. Of course, the user 102 is free to leave any of these fields blank if he or she does not wish to provide such information to the sensitive information management component 104. The user 102 is also able to add additional sensitive information in a field 510 that may correspond to any number of other predefined (but not necessarily default) categories. The corresponding category may be selected from, for example, a drop down menu 512. Additionally, the user may enter customized categories of information using a field 514. A field 516 allows the user to specify a category for the sensitive information entered in the field 514. This allows the user 102 to add additional categories of sensitive information that the sensitive information management component 104 may not yet be aware of or currently track.

In an example embodiment, an extensibility component may be added where the user is able to add custom fields to a standard data set. Custom fields could be very special data that only a small percentage of users have. For example, medical information relating to rare diseases that the user wishes to share with research facilities such as clinics or universities may be one type of special sensitive data. The custom fields can be propagated automatically to the API and user interface where the user can restrict access to that data.

In an example embodiment, the sensitive information management component 104 may include a dashboard module 130. The dashboard module 130 is responsible for generating a dashboard with various information about the sensitive information and its accesses that can be shared with the user 102 via the user interface 106.

Figure 6:
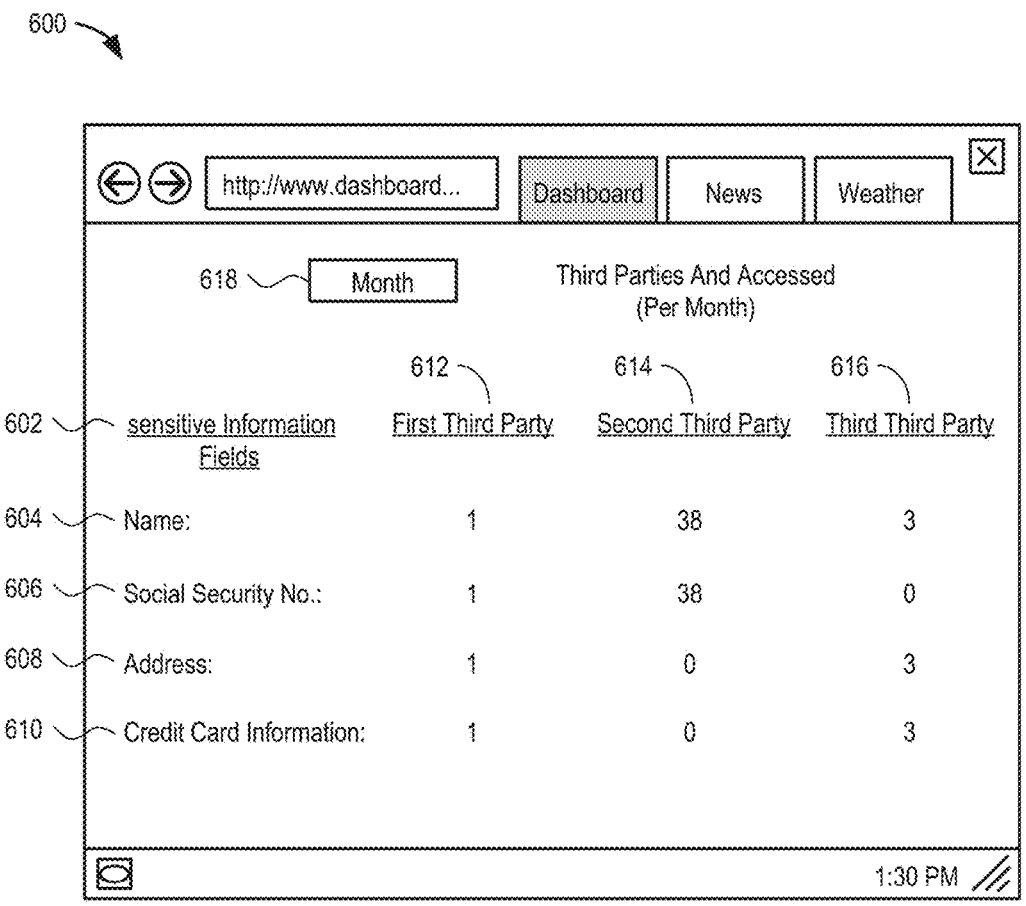
FIG. 6 is a screen diagram of an example dashboard presented in a user interface, in accordance with an example embodiment.

FIG. 6 is a screen diagram of an example dashboard 600 presented in a user interface 602, in accordance with an example embodiment. The dashboard 600 includes various categories of sensitive information that the user 102 has entered, including name 604, social security number 606, address 608, and credit card information 610. The dashboard 600 also identifies the numbers of accesses of various third party entities 612-616 to the various categories of sensitive information 604-610. In this example, the information about number of accesses is presented in a table format and is based on accesses in the last month, but one of ordinary skill in the art will recognize that the dashboard 600 can present the access information in any number of different ways and using any number of different presentation methodologies, such as, for example, charts, graphs, text, audio, etc. Controls, such as a time control 618, may be provided to allow the user to change various settings of the presentation. Here, the time control 618 may allow the user to adjust the information being presented from the last month's information to information related to some other timespan (e.g., last week or last two months).

It should be noted that throughout this disclosure the term "sensitive information", in one example embodiment, refers to information about the user himself or herself (as opposed to, for example, information about a device that the user is utilizing or contextual information about the user such as current location). Additionally, in an example embodiment, "sensitive information" is separate and distinct from login information or credentials used to validate the identity of the user. The sensitive information is additionally, in an example embodiment, used by the third parties not merely to validate the user's identity (such as in single sign-on), but rather for some other non-validation purpose, such as to conduct a financial transaction.

Figure 7:
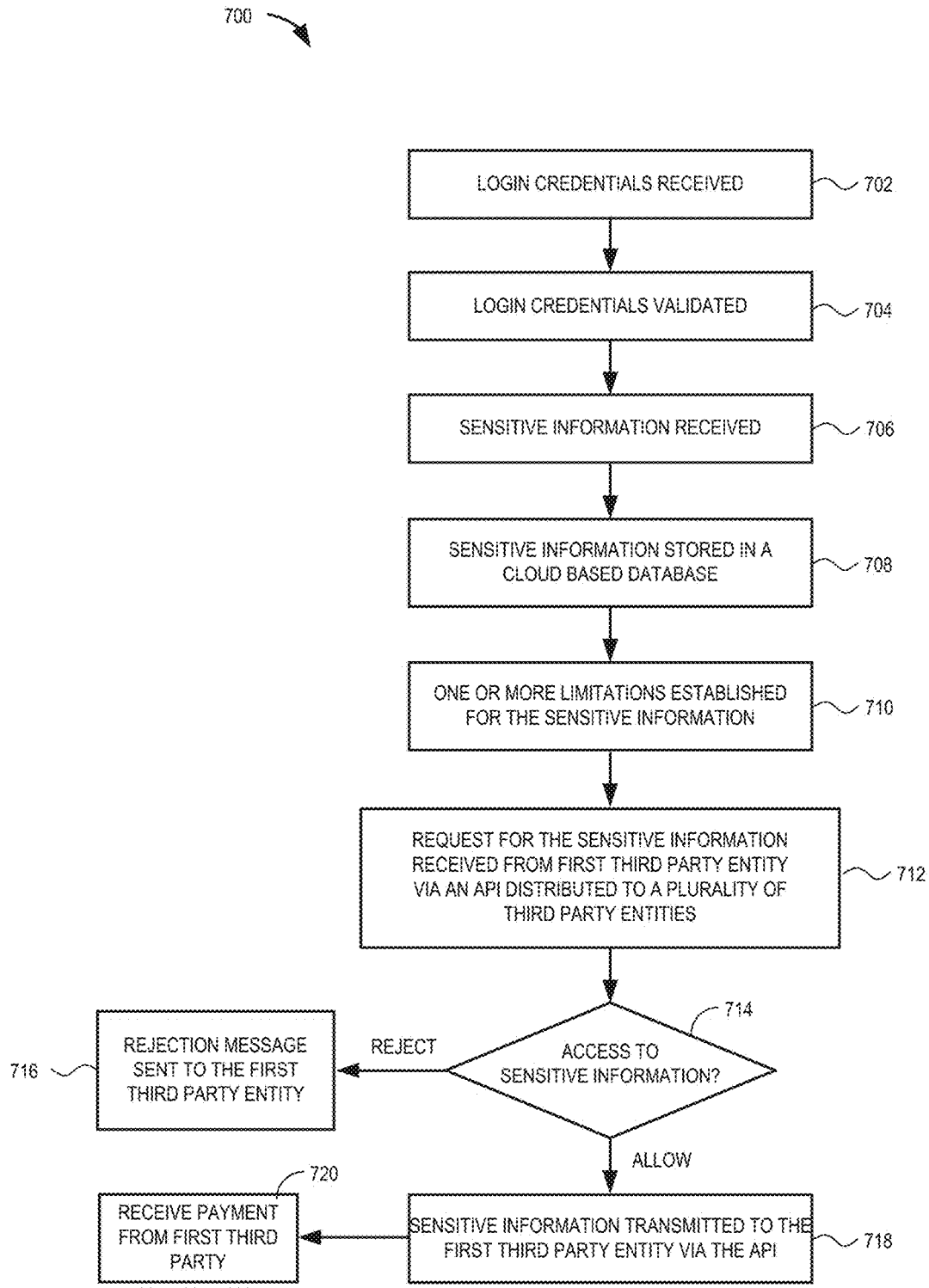
FIG. 7 is a flow diagram illustrating a method, in accordance with an example embodiment, of providing cloud-based access to sensitive information.

FIG. 7 is a flow diagram illustrating a method 700, in accordance with an example embodiment, of providing cloud-based access to sensitive information. At operation 702, login credentials are received from a user. These login credentials may be received via, for example, a user interface such as a web site. At operation 704, the login credentials may be validated, ensuring that the user is who he or she claims to be. This may be performed using, for example, a sensitive information identity provider module. At operation 706, sensitive information is received from the user. At operation 708, the sensitive information is stored in a cloud-based database. In one example embodiment, the cloud-based database may be a cloud-based in-memory database management system. At operation 710, one or more access limitations may be established for the sensitive information. These access limitations may be specified, for example, by the user via the user interface.

At operation 712, a request for the sensitive information is received from a first third party entity via an API distributed to a plurality of third party entities. At operation 714, it is determined if providing access to the sensitive information to the first third party entity would violate the one or more access limitations for the sensitive information. If so, then at operation 716 a rejection message is sent to the first third party entity. If not, then at operation 718 the sensitive information is transmitted to the first third party entity via the API.

At operation 720, payment is received from the first third party entity in exchange for the transmitting of the sensitive information. It should be noted that in some example embodiments the payment is received prior to the sensitive information being transmitted.

Figure 8:
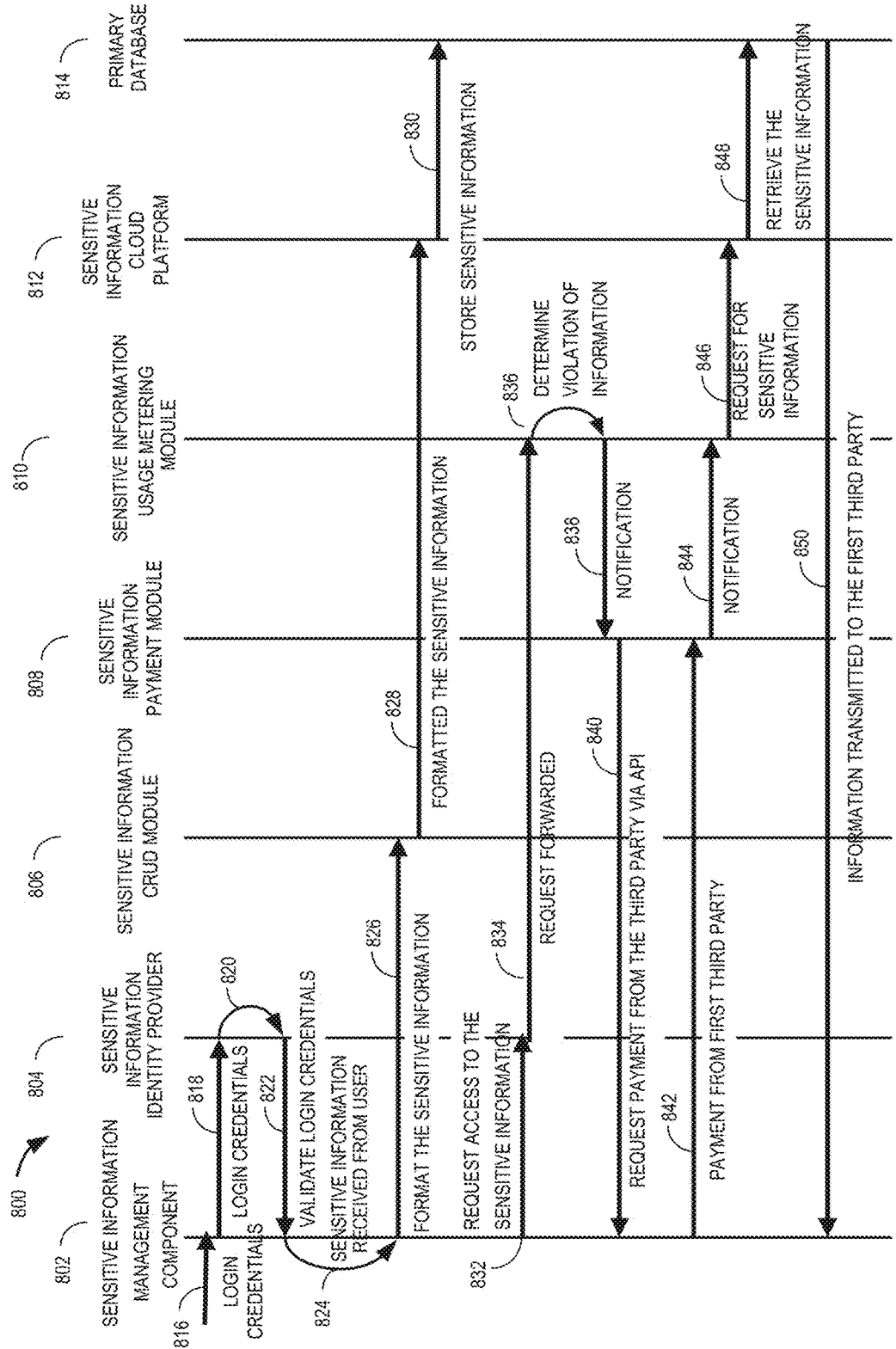
FIG. 8 is a sequence diagram illustrating a method, in accordance with an example embodiment, of providing cloud-based access to sensitive information.

FIG. 8 is a sequence diagram illustrating a method 800, in accordance with an example embodiment, of providing cloud-based access to sensitive information. The method 800 utilizes a sensitive information management component 802, sensitive information identity provider module 804, sensitive information CRUD module 806, sensitive information payment module 808, sensitive information usage metering module 810, sensitive information cloud platform 812, and primary database 814.

At operation 816, the sensitive information management component 802 receives login credentials from a user. These login credentials may be, for example, a user name and password, or a certificate, and may be received via a user interface such as a web site. At operation 818, the sensitive information management component 802 forwards the login credentials to the sensitive information identity provider module 804. The sensitive information identity provider module 804 validates the login credentials at operation 820, and at operation 822 forwards an indication of the validation of the login credentials to the sensitive information management component 802. It should be noted that this figure only depicts the case where the login credentials are validated. In cases where the login credentials are not validated, the method 800 may end or the receipt of sensitive information from the user may be ignored as potentially fraudulent.

At operation 824, sensitive information is received from the user. At operation 826 this sensitive information is sent to the sensitive information CRUD module 806. At operation 826, the sensitive information CRUD module 806 formats the sensitive information in a manner that is compatible with the primary database 814. At operation 828, the sensitive information CRUD module 806 sends the formatted sensitive information to the sensitive information cloud platform 812, which at operation 830 stores the sensitive information in the primary database 814.

At operation 832 a request is received at the sensitive information management component 802 via an API that has been distributed to a plurality of different third party entities. The request is from a first third party entity and requests access to the sensitive information. At operation 834, the sensitive information management component 802 forwards the request to the sensitive information usage metering module 810, which at operation 836 determines if providing access to the sensitive information to the first third party entity would violate one or more access limitations for the sensitive information. These access limitations may have been set up previously by the user and/or an administrator. Assuming that the providing of access to the sensitive information to the first third party entity would not violate one or more access limitations for the sensitive information, at operation 838, a notification of this fact is sent to the sensitive information payment module 808, which at operation 840 requests payment from the first third party entity through the sensitive information management component 802 via the API. At operation 842, the sensitive information payment module 808 receives payment from the first third party entity, and at operation 844 notifies the sensitive information usage metering module 810 of this fact. At this point, at operation 846, the sensitive information usage metering module 810 forwards the request for the sensitive information to the sensitive information cloud platform 812, which at operation 848 retrieves the sensitive information from the primary database 814. At operation 850, the sensitive information is transmitted to the first third party entity via the sensitive information management component 802.

Example Mobile Device

Figure 9:
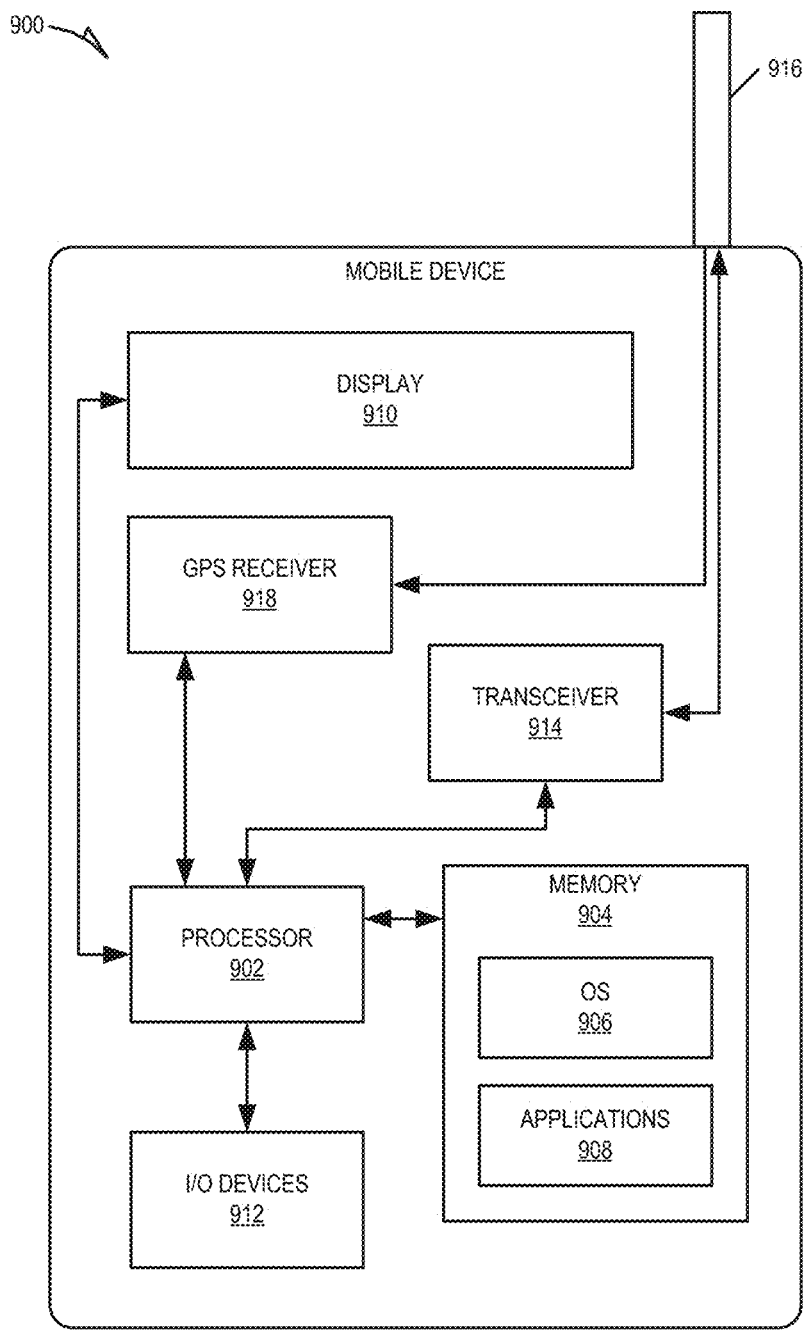
FIG. 9 is a block diagram illustrating a mobile device, according to an example embodiment.

FIG. 9 is a block diagram illustrating a mobile device 900, according to an example embodiment. The mobile device 900 may include a processor 902. The processor 902 may be any of a variety of different types of commercially available processors 902 suitable for mobile devices 900 (for example, an XScale architecture microprocessor, a microprocessor without interlocked pipeline stages (MIPS) architecture processor, or another type of processor 902). A memory 904, such as a random access memory (RAM), a flash memory, or another type of memory, is typically accessible to the processor 902. The memory 904 may be adapted to store an operating system (OS) 906, as well as application programs 908, such as a mobile location enabled application that may provide location-based services to a user. The processor 902 may be coupled, either directly or via appropriate intermediary hardware, to a display 910 and to one or more input/output (I/O) devices 912, such as a keypad, a touch panel sensor, a microphone, and the like. Similarly, in some embodiments, the processor 902 may be coupled to a transceiver 914 that interfaces with an antenna 916. The transceiver 914 may be configured to both transmit and receive cellular network signals, wireless data signals, or other types of signals via the antenna 916, depending on the nature of the mobile device 900. Further, in some configurations, a GPS receiver 918 may also make use of the antenna 916 to receive GPS signals.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client or server computer system) or one or more processors (e.g., processor 902) may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor 902 or another programmable processor 902) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired), or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor 902 configured using software, the general-purpose processor 902 may be configured as respective different hardware-implemented modules at different times. Software may accordingly configure a processor 902, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses that connect the hardware-implemented modules). In embodiments in which multiple hardware-implemented modules are configured or instantiated at different times, communications among such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors 902 that are temporarily configured (e.g., by software) or permanently configured to perform the relevant operations. Whether temporarily or permanently configured, such processors 902 may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors 902 or processor-implemented modules. The performance of certain of the operations may be distributed among the one or more processors 902, not only residing within a single machine, but deployed across a number of machines. In some example embodiments, the processor or processors 902 may be located in a single location (e.g., within a home environment, an office environment, or a server farm), while in other embodiments, the processors 902 may be distributed across a number of locations.

The one or more processors 902 may also operate to support performance of the relevant operations in a "cloud computing" environment or as a "software as a service" (SaaS). For example, at least some of the operations may be performed by a group of computers (as examples of machines including processors 902), these operations being accessible via a network (e.g., the Internet) and via one or more appropriate interfaces (e.g., application programming interfaces (APIs)).

Electronic Apparatus and System

Example embodiments may be implemented in digital electronic circuitry, or in computer hardware, firmware, or software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor 902, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors 902 executing a computer program to perform functions by operating on input data and generating output. Method operations can also be performed by, and apparatus of example embodiments may be implemented as, special purpose logic circuitry, e.g., an FPGA or an ASIC.

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor 902), or in a combination of permanently and temporarily configured hardware may be a design choice. Below are set out hardware (e.g., machine) and software architectures that may be deployed, in various example embodiments.

Example Machine Architecture and Machine-Readable Medium

Figure 10:
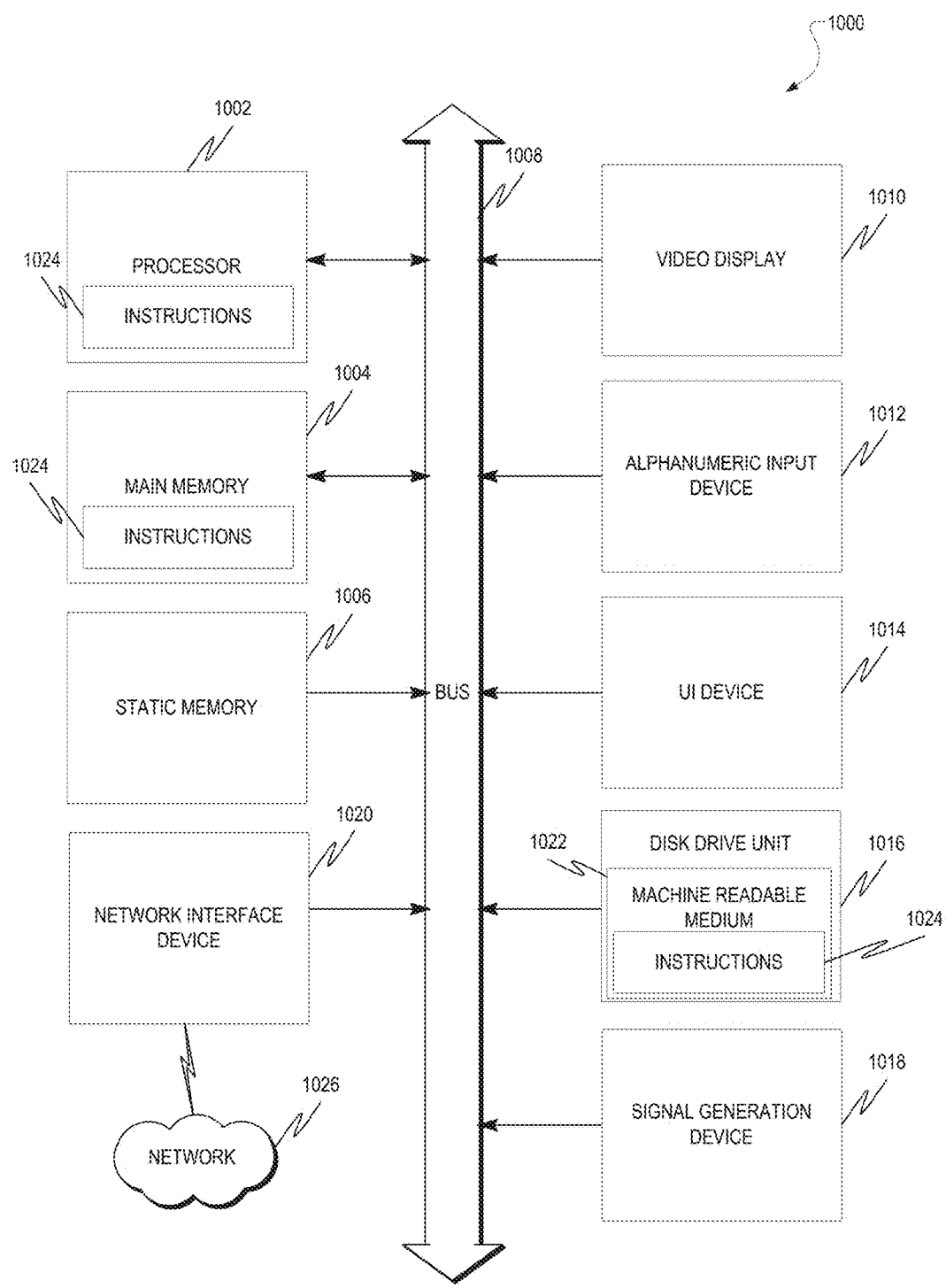
FIG. 10 is a block diagram of a machine in the example form of a computer system within which instructions may be executed for causing the machine to perform any one or more of the methodologies discussed herein.

FIG. 10 is a block diagram of a machine in the example form of a computer system 1000 within which instructions 1024 may be executed for causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a sensitive computer (PC), a tablet PC, a set-top box (STB), a sensitive digital assistant (PDA), a cellular telephone, a web appliance, a network router, switch, or bridge, or any machine capable of executing instructions 1024 (sequential or otherwise) that specify actions to be taken by that machine. Further, while only a single machine is illustrated, the term "machine" shall also be taken to include any collection of machines that individually or jointly execute a set (or multiple sets) of instructions 1024 to perform any one or more of the methodologies discussed herein.

The example computer system 1000 includes a processor 1002 (e.g., a central processing unit (CPU), a graphics processing unit (GPU), or both), a main memory 1004, and a static memory 1006, which communicate with each other via a bus 1008. The computer system 1000 may further include a video display unit 1010 (e.g., a liquid crystal display (LCD) or a cathode ray tube (CRT)). The computer system 1000 also includes an alphanumeric input device 1012 (e.g., a keyboard or a touch-sensitive display screen), a user interface (UI) navigation (or cursor control) device 1014 (e.g., a mouse), a disk drive unit 1016, a signal generation device 1018 (e.g., a speaker), and a network interface device 1020.

Machine-Readable Medium

The disk drive unit 1016 includes a machine-readable medium 1022 on which is stored one or more sets of data structures and instructions 1024 (e.g., software) embodying or utilized by any one or more of the methodologies or functions described herein. The instructions 1024 may also reside, completely or at least partially, within the main memory 1004 and/or within the processor 1002 during execution thereof by the computer system 1000, with the main memory 1004 and the processor 1002 also constituting machine-readable media 1022.

While the machine-readable medium 1022 is shown, in an example embodiment, to be a single medium, the term "machine-readable medium" may include a single medium or multiple media (e.g., a centralized or distributed database, and/or associated caches and servers) that store the one or more instructions 1024 or data structures. The term "machine-readable medium" shall also be taken to include any tangible medium that is capable of storing, encoding, or carrying the instructions 1024 for execution by the machine and that cause the machine to perform any one or more of the methodologies of the present disclosure, or that is capable of storing, encoding, or carrying data structures utilized by or associated with such instructions 1024. The term "machine-readable medium" shall accordingly be taken to include, but not be limited to, solid-state memories, and optical and magnetic media. Specific examples of machine-readable media 1022 include non-volatile memory, including, by way of example, semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and CD-ROM and DVD-ROM disks.

Transmission Medium

The instructions 1024 may further be transmitted or received over a communication network 1026 using a transmission medium. The instructions 1024 may be transmitted using the network interface device 1020 and any one of a number of well-known transfer protocols (e.g., HTTP). Examples of communication networks 1026 include a local area network (LAN), a wide area network (WAN), the Internet, mobile telephone networks, plain old telephone (POTS) networks, and wireless data networks (e.g., WiFi and WiMax networks). The term "transmission medium" shall be taken to include any intangible medium that is capable of storing, encoding, or carrying the instructions 1024 for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the disclosure. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method comprising:
   receiving login credentials of a user from a user device;
   validating the login credentials;
   receiving sensitive information from the user device, the sensitive information including details different from the login credentials;
   storing the sensitive information in a cloud-based database;
   establishing one or more access limitations for the sensitive information;
   receiving a request for the sensitive information, from a first third party entity, via an application program interface accessible by a plurality of third party entities;
   determining if providing access to the sensitive information to the first third party entity would violate the one or more access limitations for the sensitive information;
   in response to a determination that the providing access to the sensitive information to the first third party entity would not violate the one or more access limitations for the sensitive information, transmitting the sensitive information to the first third party entity; and
   tracking accesses of the sensitive information and presenting information about the accesses to the user via a dashboard, wherein the dashboard includes a breakdown of which sensitive information was accessed by which third party entity and the frequency of such accesses.

2. The method of claim 1, wherein the one or more access limitations include a limit on a number of accesses of the sensitive information within a set period of time, and the method further comprises tracking the number of accesses of the sensitive information by the first third party entity.

3. The method of claim 1, wherein the dashboard further includes a mechanism for the user to set the one or more access limitations.

4. The method of claim 1, wherein the sensitive information is one portion of sensitive information provided by the user, the one portion corresponding to one category of sensitive information, and wherein the dashboard further includes a breakdown of a plurality of different portions of the sensitive information and which of those different portions were accessed by which third party entity.

5. The method of claim 1, wherein the storing the sensitive information includes storing the sensitive information in a cloud-based in-memory database management system.

6. The method of claim 1, further comprising receiving payment from the first third party entity in exchange for the transmitting of the sensitive information to the first third party entity.

7. A system comprising:
   a sensitive information management component executable by one or more processors and configured to receive login credentials of a user from a user device;
   a sensitive information identity provider module configured to validate the login credentials;
   a sensitive information create, update, and delete (CRUD) module;
   a sensitive information cloud platform;
   the sensitive information management component further configured to receive sensitive information from the user device, the sensitive information including details different from the login credentials, and to transmit the sensitive information to the sensitive information cloud platform via the sensitive information CRUD module;
   a primary database;
   the sensitive information cloud platform configured to store the sensitive information in the primary database;
   an application program interface accessible by a plurality of third party entities;
   a sensitive information usage metering module; and
   the sensitive information management component further configured to establish, via the sensitive information usage metering module, one or more access limitations for the sensitive information;
   receive a request for the sensitive information, from a first third party entity, via the application program interface;
   determine, using the sensitive information usage metering module, whether providing access to the sensitive information to the first third party entity would violate the one or more access limitations for the sensitive information;
   in response to a determination that the providing access to the sensitive information to the first third party entity would not violate the one or more access limitations for the sensitive information, retrieve the sensitive information via the sensitive information cloud platform and transmit the sensitive information to the first third party entity; and
   track accesses of the sensitive information and present information about the accesses to the user via a dashboard, wherein the dashboard includes breakdown of which sensitive information was accessed b which third party entity and the frequency of such accesses.

8. The system of claim 7, further comprising a user interface accessible by the user to communicate the login credentials and the sensitive information.

9. The system of claim 7, wherein the dashboard further includes a mechanism for the user to set the one or more access limitations.

10. The system of claim 7, wherein the sensitive information is one portion of sensitive information provided by the user, the one portion corresponding to one category of sensitive information, and wherein the dashboard further includes a breakdown of a plurality of different portions of the sensitive information and which of those different portions were accessed by which third party entity.

11. The system of claim 7, wherein the one or more access limitations include a limit on a number of accesses of the sensitive information within a set period of time, and the sensitive information usage metering module is further configured to track the number of accesses of the sensitive information by the first third party entity.

12. A non-transitory machine-readable storage medium comprising instructions which, when implemented by one or more machines, cause the one or more machines to perform operations comprising:

receiving login credentials of a user from a user device;
validating the login credentials;
receiving sensitive information from the user device, the sensitive information including details different from the login credentials;
storing the sensitive information in a cloud-based database;
establishing one or more access limitations for the sensitive information;
receiving a request for the sensitive information, from a first third party entity, via an application program interface accessible by a plurality of third party entities;
determining if providing access to the sensitive information to the first third party entity would violate the one or more access limitations for the sensitive information;
in response to a determination that the providing access to the sensitive information to the first third party entity would not violate the one or more access limitations for the sensitive information, transmitting the sensitive information to the first third party entity; and
tracking accesses of the sensitive information and presenting information about the accesses to the user via a dashboard, wherein the dashboard includes a breakdown of which sensitive information was accessed by which third party entity and the frequency of such accesses.

13. The non-transitory machine-readable storage medium of claim 12, wherein the dashboard includes a breakdown of which sensitive information was accessed by which third party entity and the frequency of such accesses.

14. The non-transitory machine-readable storage medium of claim 13, wherein the dashboard further includes a mechanism for the user to set the one or more access limitations.

15. The non-transitory machine-readable storage medium of claim 13, wherein the sensitive information is one portion of sensitive information provided by the user, the one portion corresponding to one category of sensitive information, and wherein the dashboard further includes a breakdown of a plurality of different portions of the sensitive information and which of those different portions were accessed by which third party entity.

* * * * *